UNITED STATES PATENT OFFICE.

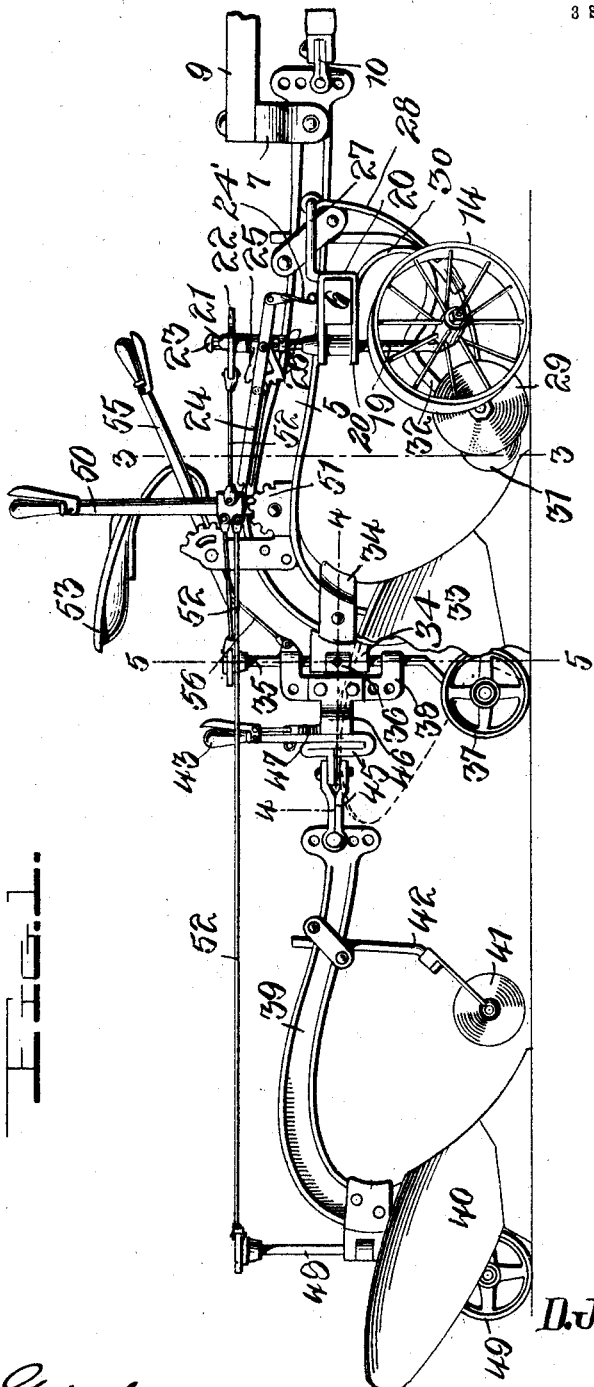

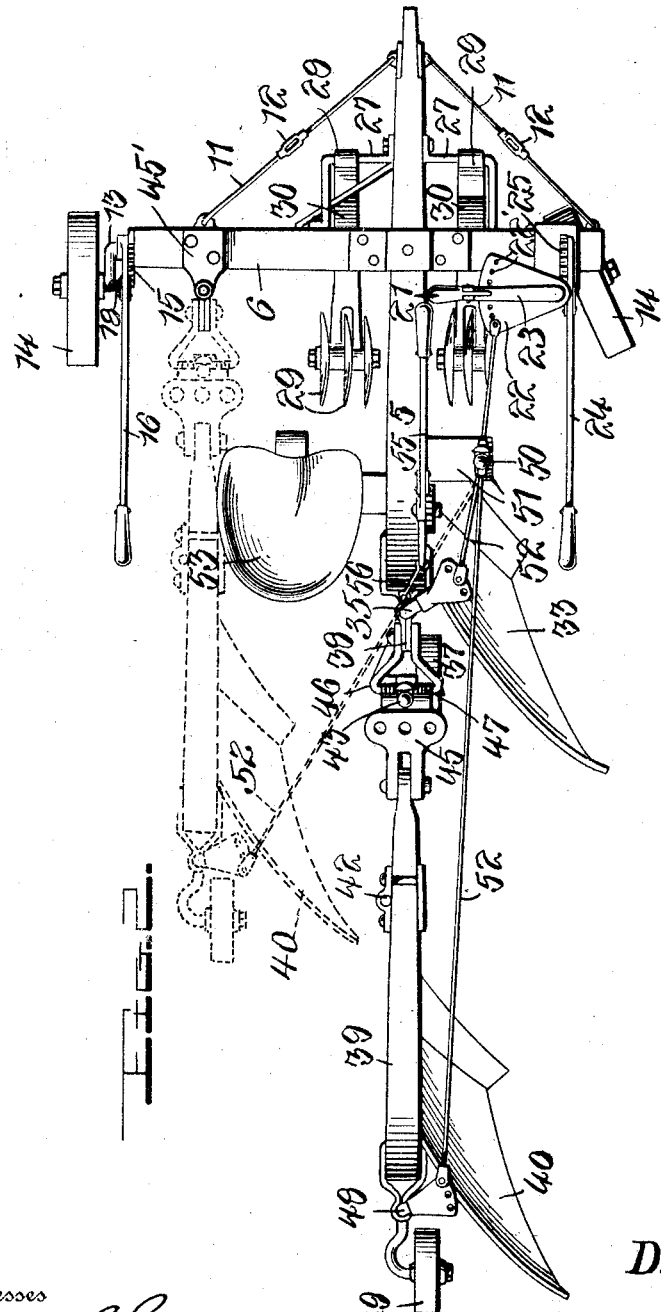

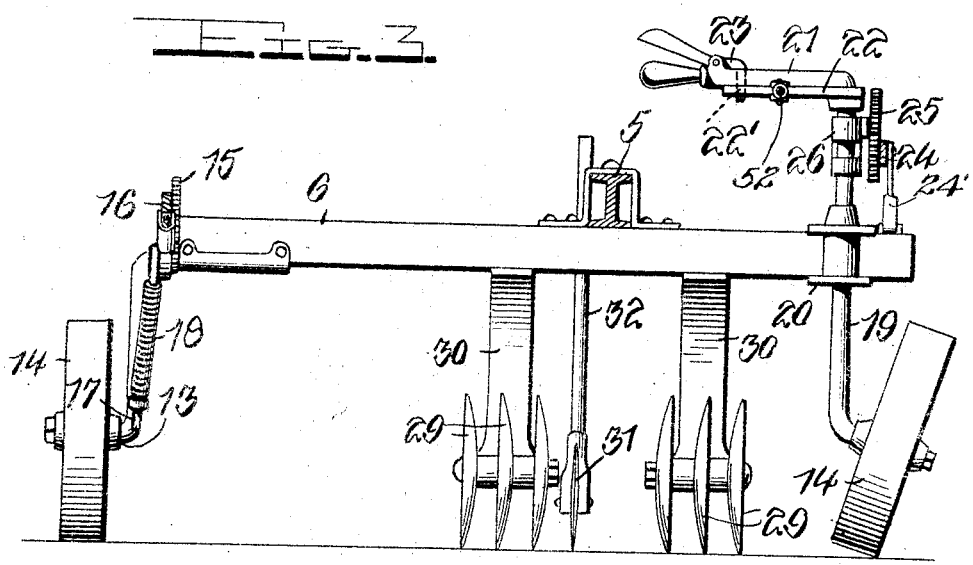
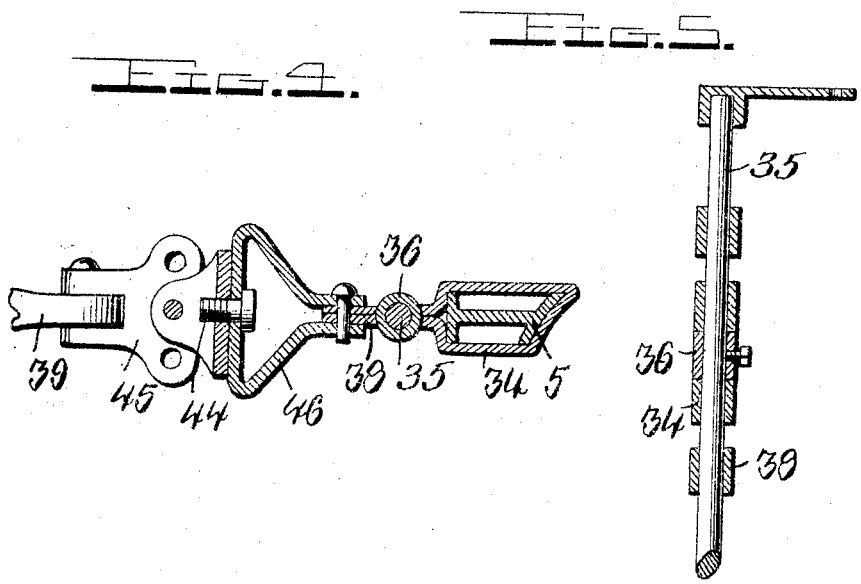

DONALD JAMES McINTOSH, OF DENTON, MONTANA.

PLOW.

988,203.

Specification of Letters Patent. Patented Mar. 28, 1911.

Application filed June 22, 1910. Serial No. 568,383.

*To all whom it may concern:*

Be it known that I, DONALD J. MCINTOSH, a citizen of the United States, residing at Denton, in the county of Fergus and State of Montana, have invented certain new and useful Improvements in Plows, of which the following is a specification, reference being had to the accompanying drawings.

This invention relates to certain new and useful improvements in subsoil plows and has for its object to improve the construction and increase the efficiency of plows of this character without materially increasing the cost of manufacture.

Another object resides in the provision of a subsoil plow, the wheels of said plow being adjustable whereby the depth to which the plow points enter the ground may be regulated.

A further object is to provide means for simultaneously directing the ground wheels and the supporting wheels of the plows.

A still further object is to provide a new and novel means for mounting the sod breaking disk gangs.

With these and other objects in view the invention consists of the novel features of construction, combination and arrangement of parts hereinafter fully described and claimed, and illustrated in the accompanying drawings, in which—

Figure 1 is a side elevation of a machine embodying my improvements; Fig. 2 is a top plan view thereof; Fig. 3 is a section taken on the line 3—3 of Fig. 1; Fig. 4 is a section taken on the line 4—4 of Fig. 1; Fig. 5 is an enlarged detail section taken on the line 5—5 of Fig. 1.

Referring more particularly to the drawings 5 indicates the plow beam of the forward or main plow. This beam is mounted upon a transverse bar or axle 6 and is rigidly secured thereto. A substantially U-shaped plate 7 is secured on the forward end of the plow beam and has its ends pivotally connected by means of a transverse bolt or pin. Upon this plate a tongue 9 is secured and is adapted to oscillate longitudinally. A clevis 10 is also secured to the plow beam to which the draft bar is adapted to be attached. The ends of the transverse axle bar 6 are connected to the forward end of the plow beam by the rods 11, said rods each being formed in two sections connected by means of a turn buckle 12 whereby they may be tightened thus rigidly securing the axle bar and the plow beam and serving as a support for the ground wheels.

An axle spindle 13 is rotatably mounted in one end of the bar 6 and carries one of the ground wheels 14. A rack segment 15 is secured to the bar 6 and a lever 16 is pivotally secured to the rack segment and carries the usual spring actuated pawl for engagement with the teeth thereof. A short rod 17 connects this lever to the axle spindle and a tension spring 18 is arranged on said rod normally tending to hold the wheel into engagement with the ground. Upon the manipulation of the lever 16 the axle spindle is rotated and the wheel raised, the spring 18 absorbing all shock or jar to the machine in the adjustment of the wheel. This adjustment of the wheel together with the adjustment of the other ground wheel and the plow supporting wheels permits of the regulation of the plow points so that they may be engaged in the ground to any desired depth. Upon the other end of the bar 6 an axle spindle 19 is vertically movable in the bearing 20 secured thereon. This spindle has mounted upon its lower end the other of the ground wheels 14. The upper end of the spindle 19 is laterally extended to provide a handle 21. A plate 22 is loosely mounted upon the axle spindle 19. This plate is provided with a plurality of openings 22' which are adapted to receive a spring controlled locking bolt 23 carried by the handle 21. Thus the axle spindle may be readily rotated in its bearing to turn the wheel and is locked by the engagement of the bolt in one of the openings of the plate 22.

A lever 24 is pivoted upon a rack segment 25 formed upon a sleeve 26 through which the axle spindle 19 extends. This sleeve is arranged between collars fixed to the spindle whereby vertical movement of the spindle through the sleeve is prevented. One end of the lever is pivoted to an arm 24' secured to the bar 6, said lever carrying a spring controlled dog for locking engagement with the rack. Thus when the lever 24 is raised or lowered, the axle spindle 19 and the ground wheel carried thereby will also be raised and lowered.

A rod 27 is rigidly secured to the plow beam 5 and the bar 6 and to this rod one end of a curved downwardly extending bar or rod 28 is secured and carries a plurality of sod breaking disks 29. These disks are yieldingly held in engagement with the ground by means of a leaf spring 30 one end of which is secured to the bar and the other end to the underside of the transverse axle bar 6. A single disk 31 is also disposed adjacent to the disk gang 29 and is carried by the lower end of a rod 32 rigidly secured at its upper end to the plow beam 5. The sod breaking disks are arranged in advance of and adjacent to the mold board 33 which is of the usual construction and is secured to the rear lower end of the plow beam.

A band or yoke 34 is secured to the plow beam immediately above the mold board and a vertically disposed rod 35 is mounted in the rearwardly extending intermediate portion of this band. The central portion of the band which surrounds the rod is cut away to receive a collar 36 carried by the rod. This collar is rigidly secured on the rod and prevents its vertical movement through the sleeve formed by the band. The lower end of the rod is angularly disposed and has mounted thereon a supporting wheel 37 which engages with the ground and supports the rear end of the plow.

A clevis 38 is loosely carried by the rod 35 and has connected thereto the rear subsoil plow. This plow consists of the beam 39 and the mold board 40. The beam also carries a single harrow disk 41 rotatably mounted in the lower end of a rod 42 rigidly secured to the beam.

The mold board 40 is adapted to be transversely disposed out of alinement with the forward mold board if desired by means of a lever 43. This lever is rigidly secured at its lower end to a rod 44 carried by a plate 45 pivotally fixed to the plow beam 39. This rod extends through the connecting member 46 which connects the rear plow to the front plow. A rack 47 is formed upon the member 46, the teeth of which are adapted to be engaged by a pawl carried by the lever whereby the plate 45 may be held in its adjusted position. By moving the lever 43, the plate 45 is swung upon the pivot rod 44 and the point of the plow 40 deflected to one side of the direct line of movement of the machine. The plate 45 is adapted to be connected to the end of the beam 39 by means of a suitable clevis as clearly illustrated in Fig. 1. A rod 48 is mounted upon the rear plow beam 39 in a similar manner to the rod 35 and has arranged on its lower end a wheel 49 which engages with the ground and supports the rear subsoil plow.

A lever 50 is mounted upon a rack segment 51 secured to the forward plow beam 5 and is connected by means of the rods 52 to the upper end of the axle spindle 19 and the rods 35 and 48. Thus by manipulating the lever 50, the ground engaging wheels may be simultaneously directed whereby the direction of movement of the plows is shifted at the same time.

The driver's seat 53 is mounted upon the rear end of the beam 5 and is so disposed that the various levers may be readily reached for the adjustment of the parts.

As shown in Fig. 2 of the drawings the rear plow of the machine is adapted to be disconnected from the end of the beam 5 to be arranged at one side of the front plow, a clevis being secured upon the transverse axle bar 6 to which the end of the rear plow beam may be connected. A rod 52 connects the rod 48 of the plow to the lever 50 in the same manner as when the plow is arranged in the rear of the forward plow so that said plows may be simultaneously adjusted. By arranging the plows in this manner, a complete gang plow is provided when the nature of the work to be performed may require the same. The rear plow may be very easily and quickly connected and disconnected in its different positions.

By the arrangement of the colter gangs on each side of the plow beam 5, the sod will be thoroughly broken upon opposite sides of the points of the plows. The plows are so adjusted that when the machine is being operated, the disk gangs cut up the sod in advance of the plow points. The first of the plows then turns this loose upper crust of the earth over, whereby the same is thoroughly broken. The second of the plows which follows in the same furrow turns up the subsoil or the soil beneath the upper layer of earth, the loose upper soil being thrown to one side so as to leave a clear furrow for the rear plow. Thus the under soil is thoroughly broken up and the seed which is sown in the ground is thus allowed to receive a greater amount of the nutriment contained in the soil.

From the foregoing it is believed that the construction and operation of my improved plow will be readily understood. The machine is comparatively simple and will efficiently perform the functions for which it is designed. It may also be manufactured at a low cost and is extremely strong and durable in construction.

While I have shown and described the preferable embodiment of the invention, it will be understood that the same is susceptible of many minor modifications without departing from the spirit or sacrificing any of the advantages thereof.

The rear plow may also be independently adjusted by means of a lever 55 which is connected by a rod 56 to the clevis 38 vertically movable on the rod 35. The beam 39 may thus be raised or lowered to regulate the depth to which the plow enters the soil.

Having thus described the invention what is claimed is:—

1. In a plow of the character described, the combination of a main wheel supported plow, a wheel supported subsoil plow secured to the rear of the first named plow, and means for simultaneously adjusting the supporting wheels of said plows to angularly position the same with relation to the line of movement of the machine.

2. In a plow of the character described, the combination with a wheel supported frame, of a plow carried by said frame, a supporting wheel for said plow, a rear subsoil plow, a supporting wheel therefor, means connecting the beam of the rear plow with the beam of the first named plow whereby the rear plow may be adjusted with relation to the front plow, and means for simultaneously adjusting the supporting wheels of said plows and one of the supporting wheels of the frame.

3. In a plow of the character described, the combination with a wheel supported frame, one of said supporting wheels being angularly adjustable, a wheel supported plow carried by said frame, a rear subsoil plow, a supporting wheel therefor, means for connecting the subsoil plow to the machine frame whereby said rear plow may be disposed at one side of the front plow, a lever mounted on the frame, and connections between the axles of the plow supporting wheels and one of the frame supporting wheels whereby said wheels may be simultaneously adjusted angularly with relation to the line of movement of the machine in either position of the subsoil plow.

4. In a plow of the character described, the combination with a wheel supported plow, a second plow adjustably secured to the rear of the first named plow, said rear plow being removable, means for attaching the same to the wheel axle along side of the first named plow, supporting wheels for each of said plows, and means for simultaneously moving said wheels transversely with relation to the direction of movement of the machine in either position of the second plow.

5. In a plow of the character described, the combination of front and rear wheel supported plows, means for detachably connecting the beams of said plows, a transverse axle bar secured upon the front plow beam, a clevis on said bar, said rear plow beam being adapted for connection to said clevis to arrange the rear plow alongside of the front plow, ground wheels mounted on each end of the axle bar, means for adjusting said wheels, and means for simultaneously moving said plow supporting wheels, in either of the relative positions of the rear plow, transversely with relation to the direction of movement of the machine.

In testimony whereof I hereunto affix my signature in the presence of two witnesses.

DONALD JAMES McINTOSH.

Witnesses:
A. J. STOUGH,
H. D. MYRICK.